(12) United States Patent
Wölcken (10) Patent No.: US 9,957,802 B2
(45) Date of Patent: May 1, 2018

(54) MORPHING TRAILING EDGE DEVICE FOR AN AIRFOIL

(71) Applicant: Airbus Operations GmbH, Hamburg (DE)

(72) Inventor: Piet-Christof Wölcken, Hamburg (DE)

(73) Assignee: Airbus Operations GmbH (DE)

( * ) Notice: Subject to any disclaimer, the term of this patent is extended or adjusted under 35 U.S.C. 154(b) by 527 days.

(21) Appl. No.: 14/734,381

(22) Filed: Jun. 9, 2015

(65) Prior Publication Data

US 2016/0047246 A1 Feb. 18, 2016

(30) Foreign Application Priority Data

Jun. 12, 2014 (EP) ..................................... 14172149

(51) Int. Cl.
| | |
|---|---|
| *F01D 5/14* | (2006.01) |
| *B64C 3/48* | (2006.01) |
| *B64C 3/44* | (2006.01) |

(52) U.S. Cl.
CPC ................ *F01D 5/141* (2013.01); *B64C 3/48* (2013.01); *B64C 2003/445* (2013.01)

(58) Field of Classification Search
CPC ...... F01D 5/141; B64C 3/48; B64C 2003/445
See application file for complete search history.

(56) References Cited

U.S. PATENT DOCUMENTS

| | | | |
|---|---|---|---|
| 4,351,502 A | 9/1982 | Statkus | |
| 7,243,881 B2 * | 7/2007 | Sakurai | ..................... B64C 9/16 244/212 |
| 7,264,206 B2 * | 9/2007 | Wheaton | ................... B64C 7/02 244/210 |
| 7,270,305 B2 * | 9/2007 | Rampton | .................. B64C 9/22 244/213 |

(Continued)

FOREIGN PATENT DOCUMENTS

| | | |
|---|---|---|
| EP | 2 527 247 A1 | 11/2012 |
| FR | 721 964 A | 3/1932 |
| GB | 1496519 A | 12/1977 |

OTHER PUBLICATIONS

Search Report (EP 14 172 149.8) dated Nov. 25, 2014.

*Primary Examiner* — Igor Kershteyn
(74) *Attorney, Agent, or Firm* — Lerner, David, Littenberg, Krumholz & Mentlik, LLP (57) ABSTRACT

A morphing trailing edge device for an airfoil includes a skin member, an actuator, and a torsion element. The skin member is configured to extend on a surface of a trailing edge region of an airfoil and includes a load introduction point within a reinforced area. The skin member further includes a stiffening member arranged essentially perpendicular to the load introduction point, wherein the load introduction point, the reinforced area and the stiffening member are integrated into the skin member. The actuator is configured to drive the torsion element with an actuation load. The torsion element is configured to translate the actuation load (Continued)

to the load introduction point, so that the actuation load morphs the trailing edge region up- or downwardly relative to a horizontal plane. A morphing airfoil for an aircraft, an aircraft with a morphing airfoil and a method for manufacturing a morphing airfoil are also described.

15 Claims, 4 Drawing Sheets

(56) References Cited

U.S. PATENT DOCUMENTS

| | | | | |
|---|---|---|---|---|
| 7,338,018 B2 * | 3/2008 | Huynh | ............ | B64C 9/16 |
| | | | | 244/215 |
| 7,475,854 B2 * | 1/2009 | Lacy | ............ | B64C 9/16 |
| | | | | 244/212 |
| 7,530,533 B2 | 5/2009 | Perez-Sanchez | | |
| 7,578,484 B2 * | 8/2009 | Fox | ............ | B64C 9/22 |
| | | | | 244/214 |
| 7,708,231 B2 * | 5/2010 | Lacy | ............ | B64C 9/16 |
| | | | | 244/211 |
| 7,766,282 B2 * | 8/2010 | Kordel | ............ | B64C 9/02 |
| | | | | 244/201 |
| 8,226,048 B2 * | 7/2012 | Beyer | ............ | B64C 9/22 |
| | | | | 244/201 |
| 8,925,870 B1 * | 1/2015 | Gordon | ............ | B64C 3/28 |
| | | | | 244/200 |
| 2012/0104181 A1 | 5/2012 | Rix | | |

* cited by examiner

MORPHING TRAILING EDGE DEVICE FOR AN AIRFOIL

FIELD OF THE INVENTION

The invention relates to a morphing trailing edge device for an airfoil, a morphing airfoil for an aircraft, an aircraft with a morphing airfoil and a method for manufacturing a morphing airfoil for an aircraft.

BACKGROUND OF THE INVENTION

The design of conventional fixed wing aircraft provides an average performance over a range of mission segments, such as takeoff, cruise, dash, loiter, and landing; or optimal performance in the mission segment within which the most time is spent; and below average performance in other mission segments. Conventional mechanisms that result in geometric changes that enable operation over multiple mission segments, such as ailerons, elevators, rudders, spoilers, flaps and slats, are normally part of control systems that ensure the vehicle will be able to operate within a desired flight envelope, but the implementation of these systems does not typically result in a design that can continually respond and adapt to changing environmental, aerodynamic or flight conditions in the most efficient manner.

Therefore, there have been many attempts to design a wing or wing component that changes shape, or morphs on command or at some predetermined design characteristic. Some of these attempts involve some form of active control to change the shape. However, these common concepts can be further improved, in particular in view of the fuel consumption of an aircraft.

BRIEF SUMMARY OF THE INVENTION

Hence, there may be a need to provide a morphing trailing edge device for an airfoil, which allows a considerable reduction of the fuel consumption of an aircraft.

It should be noted that the aspects of the invention described in the following apply also to the morphing trailing edge device for an airfoil, the morphing airfoil for an aircraft, the aircraft with a morphing airfoil and the method for manufacturing a morphing airfoil for an aircraft.

According to an embodiment of the present invention, a morphing trailing edge device for an airfoil is presented. The airfoil may be a winglet, a vertical stabilizer, a horizontal stabilizer, a spoiler, a flap or the like of an aircraft. The trailing edge region may be a flap region, of a vertical stabilizer region, of a horizontal stabilizer region of a winglet region or the like. Exemplarily in view of a flap, a flap comprises a torsion box with a preceding leading edge and a trailing edge behind. By morphing, a controlled and desired change of the shape of a part and/or an assembly without the creation of discontinuities such as gaps and kinks can be understood.

The morphing trailing edge device for an airfoil according to an embodiment of the present invention comprises a skin member, an actuator, and a torsion element.

The skin member is configured to extend on a surface of a trailing edge region of an airfoil. For example, the skin member covers the surface of the trailing edge region and forms the uppermost layer of the trailing edge region. Preferably, the skin member is an upper skin member arranged at an upper side of the airfoil, e.g. to be faced off and to be thereby protected in view of road stones and tire bust. Preferably, the skin member comprises a laminate material.

The skin member comprises a load introduction point within a reinforced area. For example, the load introduction point lies within the plane of the airfoil. For example, the load introduction point lies in the surface of the trailing edge region. For example, the load introduction point is centered in a round or angular reinforced area. For example, the reinforced area is reinforced or strengthened by increasing a thickness of the skin member's material, by adding a layer of another material and/or by introducing a reinforcement component.

The skin member further comprises a stiffening member. For example, the stiffening member is a longitudinal member or rib orientated in a longitudinal direction of the aircraft. Thereby, the stiffening member may be exactly parallel to the aircraft's longitudinal axis, but may also form an angle with the aircraft's longitudinal axis between 1 and 90°, preferably 10 and 70°, more preferably 20 and 60°, and even more preferred 30 and 50°. For example, the stiffening member is a stiffened area of the skin by increasing a thickness of the skin member's material, by adding a layer of another material and/or by introducing a stiffening component.

The stiffening member is arranged essentially perpendicular to the load introduction point, which means the stiffening member extends perpendicular to the load introduction direction in the load introduction point. The load transverses the airfoil and is introduced from below into the surface of the airfoil. The stiffening member lies in and parallel to the surface of the airfoil and thereby essentially perpendicular to the load introduction direction in the load introduction point. The stiffening member may lie in the load introduction point, which means the stiffening member crosses and contacts the load introduction point. The stiffening member may also only lie in the surface of the airfoil perpendicular to the load introduction point, but spaced apart and not contacting the load introduction point.

The load introduction point, the reinforced area and the stiffening member are integrated into the skin member. This means they are part of the skin member and they are no separate components. In other words, they may be introduced into the skin member during the manufacturing of the skin member and in particular may be laminated together with the skin member. The load introduction point, the reinforced area and the stiffening member might not be removed without destruction of the skin member. They may all be made of the same material, but used locally with adapted, which may mean increased thickness.

The morphing trailing edge device for an airfoil further comprises an actuator and a torsion element. For example, the actuator is an electric, hydroelectric, pneumatic or hydraulic engine. For example, the torsion element is a torsion bar or a torsion unit. The torsion bar may extend over the airfoil's length to provide the actuation load to the trailing edge region. The torsion unit is a lighter alternative to the torsion rod, in which the torsion rod is integrated into the trailing edge region to introduce the actuation load directly into the skin member or the stiffening member.

The actuator is configured to drive the torsion element with an actuation load. The torsion element is configured to translate the actuation load to the load introduction point, so that the actuation load morphs the trailing edge region up- or downwardly relative to a horizontal plane. Again, the trailing edge region may be a region of a flap, of a vertical stabilizer region, of a horizontal stabilizer region of a winglet region or the like, while by morphing, a controlled and desired change of the shape of a part and/or an assembly without the creation of discontinuities such as gaps and kinks can be understood. Morphing the trailing edge region up- or downwardly relative to a horizontal plane can be understood as deflecting the trailing edge region up- or downwardly, or in other words, as changing the angle of the trailing edge region relative to the aircraft. The horizontal plane can be understood as the plane extending throughout the aircraft. The horizontal plane may be parallel to the ground, if the aircraft stands on the ground, but may change, when the aircraft is flying.

As a result, a morphing trailing edge device for an airfoil is provided, which allows a considerable reduction of the fuel consumption of an aircraft. The reduced fuel consumption is achieved as a change of a trailing edge region (as a flap or a winglet) is enabled, which allows an adaption of a shape of the trailing edge region to different conditions and situations of an aircraft's flight, as e.g. start, cruise and landing, but also different heights during cruise.

Further, the morphing trailing edge device for an airfoil according to the invention allows using a combined low-cost kinematic and aerodynamic surface to achieve above described considerable reduction of the fuel consumption without, at the same time, considerably increasing the costs of the device and therefore of the aircraft.

As most components and functions of the morphing trailing edge device for an airfoil are integrated into the skin member, the number of separate components and the weight can be considerably reduced. The skin member can be designed and manufactured to be adaptable to all temporal and/or local operation conditions within the aircrafts flight envelope.

In an example, the skin member is an upper skin member, while the morphing trailing edge device for an airfoil further comprises a lower skin member. The upper skin member is configured to extend on an upper surface of the trailing edge region of an airfoil, while the lower skin member is configured to extend on a lower surface of the trailing edge region of an airfoil.

Preferably, the skin member or the upper skin member is optimized for morphing and with respect to its shape in loaded conditions in view of thickness, layup, use of stiffening elements and/or overall stiffness to ensure an achievement of geometrical target shapes under aerodynamic and actuation loads. Preferably, the lower skin member is of simple design and designed and attached repairably, for example by riveting, to the torsion box behind a rear spar for easy maintenance. Preferably, the lower skin member is designed to cope with road stone and tire bust. Preferably, the trailing edge is designed to ensure flutter elimination.

Preferably, classical certifiable skin member material concepts are used, which gives the morphing trailing edge device sufficient lifetime for commercial applications and makes it not too expensive. In an example, the skin member is designed while considering a 3D loading, manufacturing and maintenance costs and/or robustness as design drivers.

In an example, the stiffening member may also comprise two stiffening arms arranged in an X-shape or in a V-shape lying in the surface of the airfoil perpendicular to the load introduction point. This means, the two stiffening arms are arranged with different angles to the aircraft's longitudinal axis and crossing each other to form the X-shape or the V-shape when seen from above. The crossing point of the X-shape or the V-shape may be the load introduction point, but may also be spaced apart from it.

In an example, the actuator is a maximum of two sub-actuators, which are preferably arranged in parallel. Reducing the number of actuators is beneficial in view of failure and hazard analysis. In an example, the actuator is located within the trailing edge region or within the torsion box of an airfoil. In an example, the actuator is attached to the torsion element by an actuation rod or is mounted in line with torsion element.

In an example, the morphing trailing edge device further comprises a load introduction rod configured to transmit the actuation load from the torsion element to the load introduction point. The load introduction rod may therefore be arranged between the torsion element and the load introduction point. Further, a bearing can be arranged between the torsion element or the load introduction rod and the load introduction point.

The load introduction may occur at any camber position within the trailing edge region, as e.g. on the upper skin member of the morphing trailing edge region, on a non-morphing trailing edge region and/or a mixture thereof. Preferably, the morphing trailing edge region is configured to be in a neutral position without actuation under typical cruise flight loads.

According to the present invention, also a morphing airfoil for an aircraft is presented. The morphing airfoil comprises a morphing trailing edge device as explained above. The airfoil may be a winglet, a vertical stabilizer, a horizontal stabilizer, a flap or the like of an aircraft. The airfoil may also be larger parts of a wing or the entire wing. In an example, the trailing edge region covers between 5 and 40% of a wing camber or between 5 and 75% of a flap camber. Preferably, the trailing edge region covers between 10 to 30% of a wing camber or between 20 and 50% of a flap camber.

According to an embodiment of the present invention, also an aircraft with a morphing airfoil is presented. The aircraft comprises a morphing trailing edge device as explained above. The aircraft may be a plane, a helicopter, a drone or the like.

According to an aspect of the present invention, also a method for manufacturing a morphing airfoil for an aircraft is presented. It comprises the following steps, not necessarily in this order:

a) providing a skin member comprising a load introduction point within a reinforced area and a stiffening member arranged essentially perpendicular to the load introduction point, b) extending the skin member on a surface of a trailing edge region of an airfoil, c) providing a torsion element, and d) providing an actuator configured to drive the torsion element with an actuation load.

The load introduction point, the reinforced area and the stiffening member are integrated into the skin member. The torsion element is configured to translate the actuation load to the load introduction point, so that the actuation load morphs the trailing edge region up- or downwardly relative to a horizontal plane.

In an example, the torsion element and the skin member are manufactured individually and joined by riveting and/or adhesive bonding. In another example, the torsion element and the skin member are manufactured in a single lamination step.

In an example, the skin member is made to provide a yield strength between 0.5 and 4%, preferably between 1 and 3%, and even more preferred between 1 and 2.5%. The skin member may be further made to provide an elastic modulus between 2 and 6 GPa, preferably between 3 and 5 GPa, and even more preferred between 3 and 4 GPa. These properties can be achieved by the used material or by a processing of the material.

In an example, the skin member is made from laminate, as e.g. glass fiber reinforced plastic (e.g. Hexply 913), infiltrated glass fiber reinforced plastic, Kevlar, carbon fiber reinforced plastic or the like. The manufacturing can be made by standard lamination, but also by infusion methods for textiles, automated tape laying, hand-lay-up, Same Qualified Resin Transfer Molding (SQRTM) and the like. Standard or modified resin systems can be used.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the accompanying drawings.

DETAILED DESCRIPTION

Figure 1:
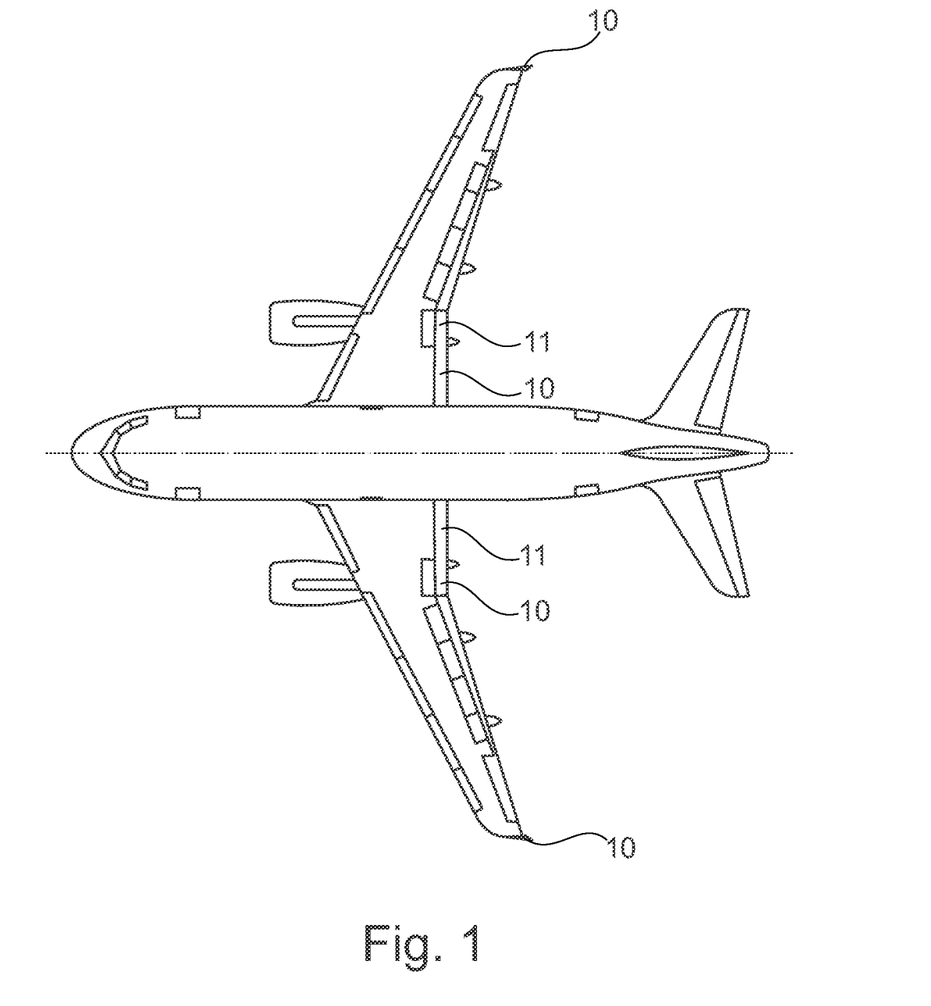
FIG. 1 shows a schematic drawing of an example of an aircraft with a morphing airfoil.

FIG. 1 shows schematically and exemplarily an embodiment of an aircraft 1 with a morphing airfoil 10 according to an embodiment of the invention. The aircraft 1 is here a plane. The morphing airfoil 10 is here shown to be a winglet and a flap 11 of the aircraft 1. The morphing airfoil 10 comprises a morphing trailing edge device (not shown), as will be explained in detail below. By morphing, a controlled and desired change of the shape of a part and/or an assembly without the creation of discontinuities such as gaps and kinks can be understood.

Figure 2:
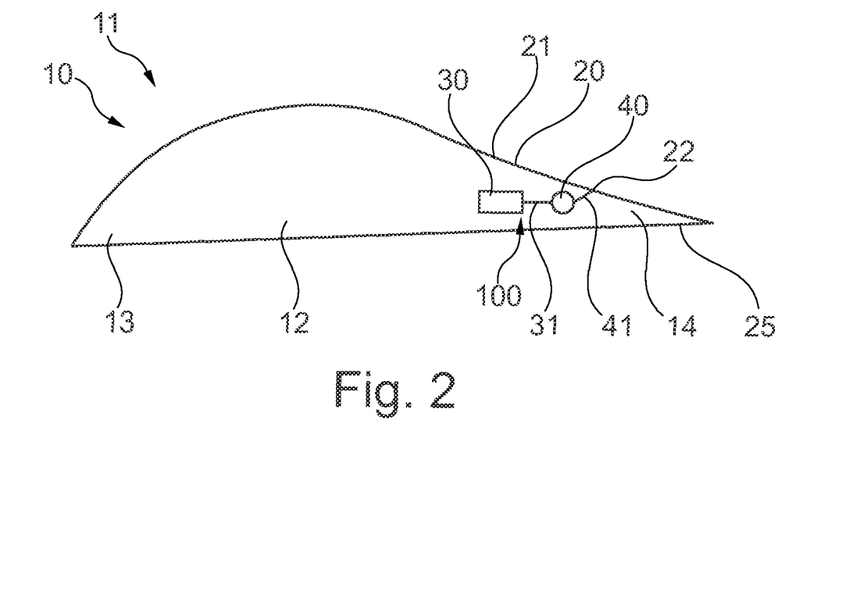
FIG. 2 shows schematically and exemplarily a cross section of the morphing airfoil.
Figure 3:
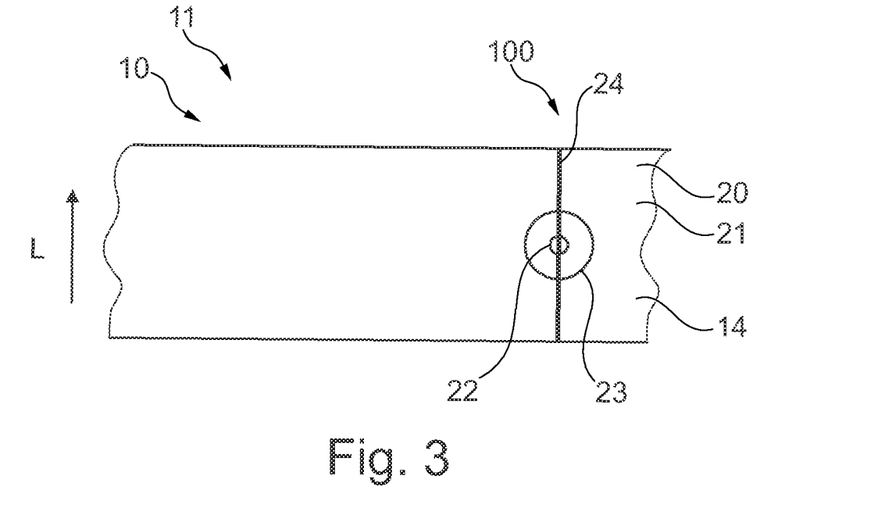
FIG. 3 shows schematically and exemplarily a part of the airfoil shown in FIG. 2 as seen from above.

FIG. 2 shows schematically and exemplarily a cross section of the morphing airfoil 10 according to the invention, which is here a flap 11 of the aircraft 1. FIG. 3 shows schematically and exemplarily a part of the flap 11 shown in FIG. 2 as seen from above. The flap 11 comprises a torsion box 12 with a preceding leading edge region 13 and a trailing edge region 14 behind. The flap 11 further comprises the morphing trailing edge device 100. The morphing trailing edge device comprises a skin member 20, an actuator 30, and a torsion element 40.

The skin member 20 comprises an upper skin member 21 arranged and extending on an upper surface of the trailing edge region 14 of the flap 11 and a lower skin member 25 extending on a lower surface of the trailing edge region 14 of an airfoil 10. The upper skin member 21 covers the upper surface of the trailing edge region 14 and forms the uppermost layer of the trailing edge region 14. The skin member 20 is made from a laminate material.

As can be seen in FIG. 3, showing the flap 11 from above, the upper skin member 21 comprises a load introduction point 22 within a round reinforced area 23. The load introduction point 22 and the reinforced area 23 lie within the plane of the airfoil 10 and on the surface of the trailing edge region 14. The reinforced area 23 is here reinforced or strengthened by increasing a thickness of the upper skin member's material.

As also can be seen in FIG. 3, the upper skin member 21 further comprises at least one stiffening member 24 arranged essentially in the load introduction point 22 and essentially perpendicular to the load introduction point 22. The stiffening member 24 lies in and parallel to the surface of the airfoil 10 and thereby essentially perpendicular to the load introduction direction in the load introduction point 22, as the load transverses the airfoil 10 and is introduced from below into the surface of the airfoil 10.

The stiffening member 24 is a longitudinal member orientated essentially in a longitudinal direction L of the aircraft 1. The stiffening member 24 may also form an angle with the aircraft 1's longitudinal axis (not shown). The stiffening member 24 is here a stiffened area of the skin by increasing a thickness of the skin member's material.

The load introduction point 22, the reinforced area 23 and the stiffening member 24 are integrated into the upper skin member 21, which means they are part of the upper skin member 21 and they are no separate components. They are introduced into the upper skin member 21 during the manufacturing of the upper skin member 21 and are laminated together with the upper skin member 21.

As can be seen back in FIG. 2, the morphing trailing edge device further comprises the actuator 30 and the torsion element 40. The actuator 30 is here an electric engine, while the torsion element 40 is a torsion bar. The actuator 30 drives the torsion element 40 with an actuation load. The torsion element 40 translates the actuation load to the load introduction point 22, so that the actuation load morphs the trailing edge region 14 up- or downwardly relative to a horizontal plane. Again, by morphing, a controlled and desired change of the shape of a part and/or an assembly without the creation of discontinuities such as gaps and kinks can be understood.

Figure 4:
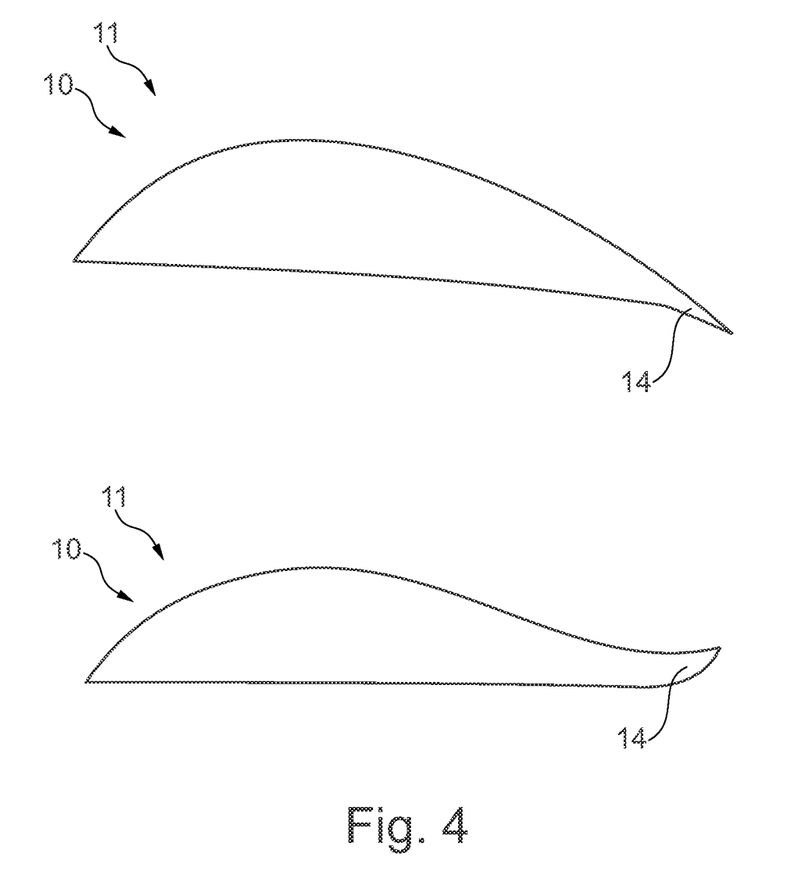
FIG. 4 shows schematically and exemplarily a morphing of a trailing edge region.

FIG. 4 shows a cross section of the morphing airfoil 10 and a morphing of the trailing edge region 14 downwardly (FIG. 4 above) or upwardly (FIG. 4 below) relative to a horizontal plane, which can be understood as deflecting the trailing edge region 14 downwardly or upwardly, or in other words, as changing the angle of the trailing edge region 14 relative to the aircraft 1. The horizontal plane can be understood as the plane extending throughout the aircraft 1.

As can be seen back in FIG. 2, the actuator 30 is here located within the torsion box 12 of the flap 11 and is attached to the torsion element 40 by an actuation rod 31. A load introduction rod 41 is used to transmit the actuation load from the torsion element 40 to the load introduction point 22. The load introduction rod 41 is therefore arranged between the torsion element 40 and the load introduction point 22. The load introduction may occur at any camber position within the trailing edge region 14, as e.g. on the upper skin member 21 of the morphing trailing edge region 14 or on a non-morphing trailing edge region 14.

Figure 5:
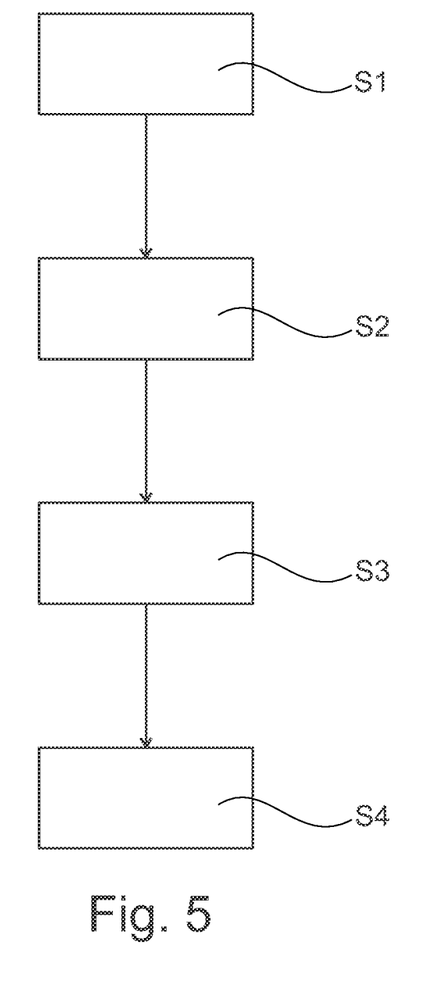
FIG. 5 shows the basic steps of an example of a method for manufacturing a morphing airfoil for an aircraft

FIG. 5 shows the basic steps of an example of a method for manufacturing a morphing airfoil 10 for an aircraft 1. It comprises the following steps, not necessarily in this order:

Step 1, providing a skin member 20 comprising a load introduction point 22 within a reinforced area 23 and a stiffening member 24 arranged essentially perpendicular to the load introduction point 22, Step 2, extending the skin member 20 on a surface of a trailing edge region 14 of an airfoil 10, Step 3, providing a torsion element 40, and Step 4, providing an actuator 30 configured to drive the torsion element 40 with an actuation load.

The load introduction point 22, the reinforced area 23 and the stiffening member 24 are integrated into the skin member 20. The torsion element 40 translates the actuation load to the load introduction point 22, so that the actuation load morphs the trailing edge region 14 up- or downwardly relative to a horizontal plane.

The torsion element 40 and the skin member 20 may be manufactured individually and joined by riveting and/or adhesive bonding. The torsion element 40 and the skin member 20 may also be manufactured in a single lamination step.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A morphing trailing edge device for an airfoil, the device comprising:
    a skin member;
    a skin member;
    an actuator; and
    a torsion element,
    wherein the skin member is configured to extend on a surface of a trailing edge region of an airfoil and comprises a load introduction point within a reinforced area,
    wherein the skin member further comprises a stiffening member arranged essentially perpendicular to a load introduction direction in the load introduction point,
    wherein the load introduction point, the reinforced area and the stiffening member are integrated into the skin member,
    wherein the actuator is configured to drive the torsion element with an actuation load, and
    wherein the torsion element is configured to translate the actuation load to the load introduction point, so that the actuation load morphs the trailing edge region up- or downwardly relative to a horizontal plane.

2. The morphing trailing edge device according to claim 1, wherein the trailing edge region is a flap region, a spoiler region, a vertical stabilizer region, a horizontal stabilizer region, or a winglet region.

3. The morphing trailing edge device according to claim 1, wherein the skin member is an upper skin member configured to extend on an upper surface of a trailing edge region of an airfoil.

4. The morphing trailing edge device according to claim 1, wherein the actuator is a maximum of two sub-actuators arranged in parallel.

5. The morphing trailing edge device according to claim 1, wherein the actuator is located within the trailing edge region or within a torsion box of an airfoil.

6. The morphing trailing edge device according to claim 1, wherein the torsion element is a torsion bar or a torsion unit.

7. The morphing trailing edge device according to claim 1, further comprising a load introduction rod configured to transmit the actuation load from the torsion element to the load introduction point.

8. The morphing trailing edge device according to claim 1, wherein the stiffening member comprises first and second stiffening arms forming an X-shape lying in the surface of the airfoil, wherein a crossing point of the X-shape lies in the load introduction point.

9. The morphing trailing edge device according to claim 1, wherein the stiffening member comprises first and second stiffening arms forming a V-shape lying in the surface of the airfoil, wherein a crossing point of the V-shape lies in the load introduction point.

10. A morphing airfoil for an aircraft comprising a morphing trailing edge device comprising:
    a skin member;
    an actuator; and
    a torsion element,
    wherein the skin member is configured to extend on a surface of a trailing edge region of an airfoil and comprises a load introduction point within a reinforced area,
    wherein the skin member further comprises a stiffening member arranged essentially perpendicular to a load introduction direction in the load introduction point,
    wherein the load introduction point, the reinforced area and the stiffening member are integrated into the skin member,
    wherein the actuator is configured to drive the torsion element with an actuation load,
    wherein the torsion element is configured to translate the actuation load to the load introduction point, so that the actuation load morphs the trailing edge region in a first or a second side of a plane, and wherein the airfoil is a winglet, a vertical stabilizer, a horizontal stabilizer, a spoiler or a flap of an aircraft.

11. The morphing airfoil according to claim 10, wherein the trailing edge region covers between 5 and 40% of a wing camber or between 5 and 75% of a flap camber.

12. A method for manufacturing a morphing airfoil for an aircraft, the method comprising:
providing a skin member comprising a load introduction point within a reinforced area and a stiffening member arranged essentially perpendicular to a load introduction direction in the load introduction point;
extending the skin member on a surface of a trailing edge region of an airfoil;
providing a torsion element; and
providing an actuator configured to drive the torsion element with an actuation load,
wherein the load introduction point, the reinforced area and the stiffening member are integrated into the skin member, and
wherein the torsion element is configured to translate the actuation load to the load introduction point, so that the actuation load morphs the trailing edge region up- or downwardly relative to a horizontal plane.

13. The method according to claim 12, wherein the torsion element and the skin member are manufactured individually and joined by at least one of riveting and adhesive bonding.

14. The morphing airfoil according to claim 10, wherein the trailing edge region covers between 10 to 30% of a wing camber or between 20 and 50% of a flap camber.

15. The method of claim 12, wherein the torsion element and the skin member are manufactured in a single lamination step.

* * * * *